Jan. 6, 1970　　　G. C. RANNENBERG　　　3,487,993
COMPRESSOR BLEED AIR FLOW CONTROL
Filed Aug. 12, 1968　　　　　　　　　3 Sheets-Sheet 1

INVENTOR
GEORGE C. RANNENBERG
BY Laurence A. Savage
AGENT

FIG_4
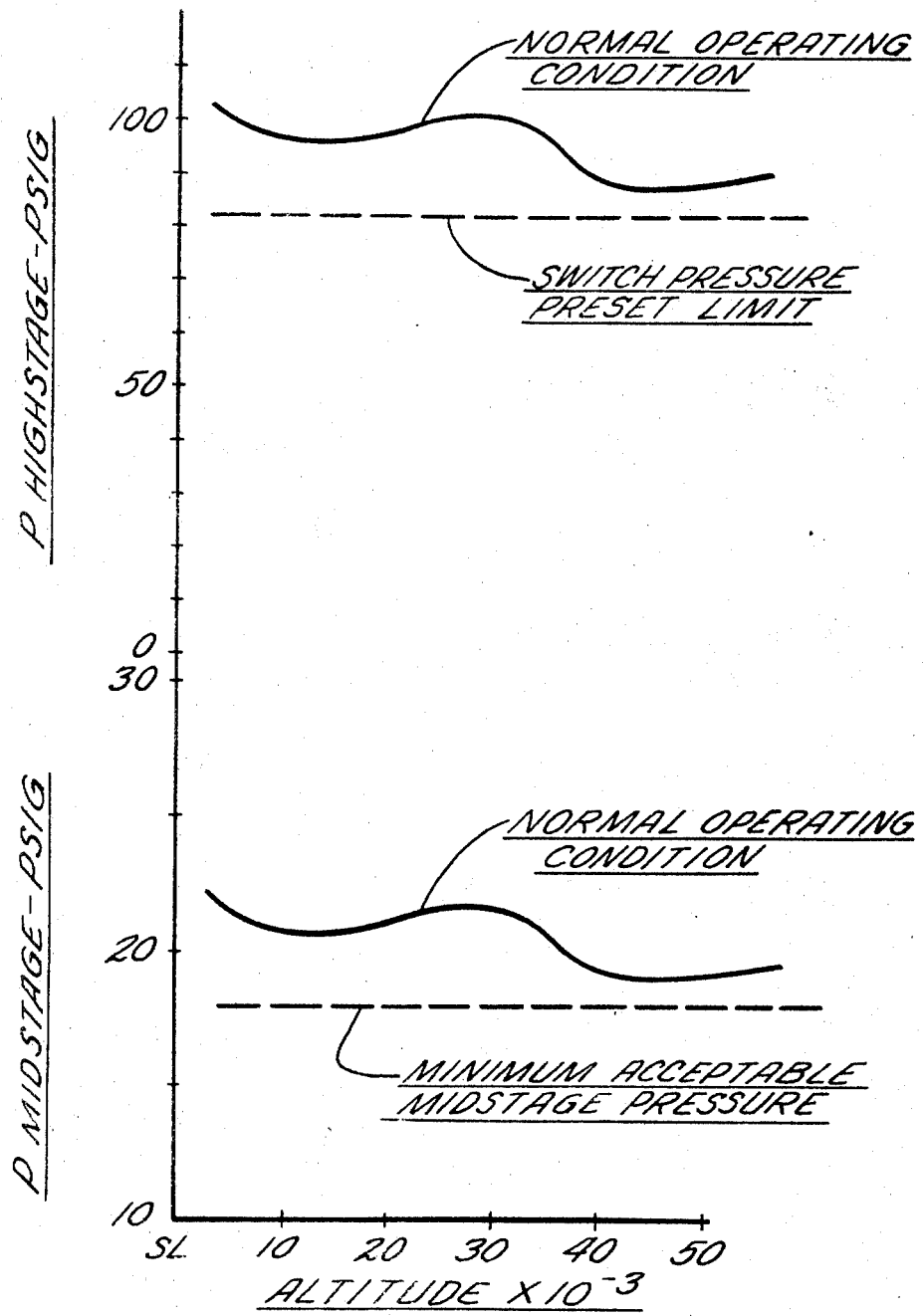

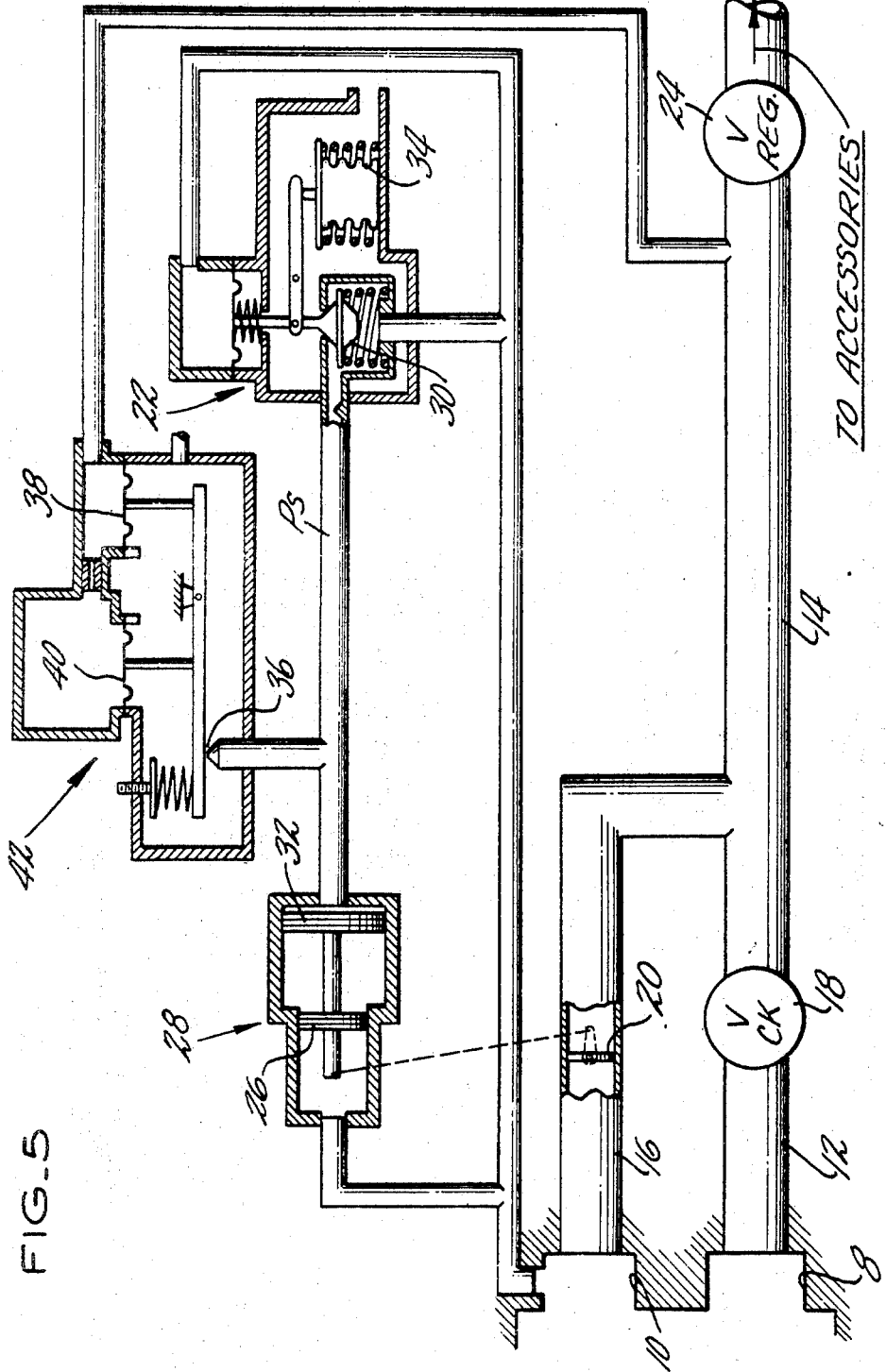
FIG._5

United States Patent Office 3,487,993
Patented Jan. 6, 1970

3,487,993
COMPRESSOR BLEED AIR FLOW CONTROL
George C. Rannenberg, East Granby, Conn., assignor to United Aircraft Corporation, East Hartford, Conn., a corporation of Delaware
Filed Aug. 12, 1968, Ser. No. 752,078
Int. Cl. F04d 27/00; F02g 1/06; F02c 3/06
U.S. Cl. 230—114                                    6 Claims

ABSTRACT OF THE DISCLOSURE

Means for switching from a first multi-stage compressor bleed to a second bleed is provided by pressure sensing means disposed to sense a pressure which is unaffected by the opening and closing of a normally closed valve and which is a function of the pressure in the first bleed, a normally closed valve disposed in a duct downstream of the second bleed, and means for opening the valve in response to the sensed pressure falling below a predetermined limit.

BACKGROUND OF THE INVENTION

Field of the invention

This invention relates to flow control means and particularly to means for controlling the bleed air flow from a multi-stage compressor and for switching from one compressor bleed to a different compressor bleed.

Description of the prior art

Air for the operation of jet aircraft environmental control systems and other accessories is usually obtained by bleeding the compressor of the gas turbine engines used to power the aircraft. Bleeding the engine compressor penalizes the efficiency of the engines and generally, the higher the stage being held in terms of stage pressure, the higher the penalty. Thus it is desirable to utilize bleed air from the lowest compressor pressure stage consonant with accessory requirements. However, at high altitude or low engine r.p.m., for example, the low stage is not capable of providing a sufficient supply pressure. Therefore, a switch must be made to a higher compressor stage to attain the necessary supply pressure during such engine operating conditions.

While such a system for accomplishing this switching is shown in the prior art, this system has the disadvantage of placing the sensing means downstream of the control valve in the main flow duct. This system is inherently unstable unless the control valve in the high-stage bleed duct is modulated when it is open so that the flow sensed by the downstream sensor, i.e., in the main flow duct, is kept at a rate which is substantially equal to the flow rate at which the high-stage valve opens. Otherwise, if it were attempted to utilize the full flow available from the high-stage bleed, the sensor would sense the higher flow and close the valve in the high-stage bleed duct thereby switching to the intermediate-stage bleed; as the switch was made the flow sensor would again sense a flow below the acceptable limit and open the control valve in the high-stage duct and the switching would go on back and forth ad infinitum. The disadvantage in modulating the high-stage flow down to a flow equal to that at which the system switches from the intermediate-stage bleed to the high-stage bleed, as is obvious to one skilled in the art, is that performance is thereby sacrificed. In other words, it is desirable to be able to use substantially the full output of the high-stage bleed once it has been found necessary to open the normally closed valve in order to get optimum performance; e.g., more capacity for the air-conditioning system or more horsepower for a pump, etc. It may be desirable to modulate the valve in the high-stage bleed duct to reduce the pressure slightly for safety reasons because if the downstream pressure regulator fails to open and the pressure sensing means fails calling for the normally closed valve to be open, the pressure regulation function added to the normally closed valve provides a safety margin.

SUMMARY OF THE INVENTION

An object of the present invention is to provide an apparatus for switching from one compressor bleed to another which is simple, accurate and reliable.

Another object of the present invention is to provide an apparatus for switching from one compressor-stage bleed to a higher-stage bleed in which substantially the full pressure of the higher-stage bleed may be utilized when the switch has been made to the higher-stage bleed, while still providing a stable system.

Another object of the present invention is to provide an apparatus for switching from one compressor-stage bleed to another stage bleed in which the pressure sensed to provide a signal for opening and closing the control valve in the high-stage duct is a function of the pressure at the first bleed but is unaffected by the opening and closing of the control valve itself.

In accordance with the present invention an apparatus for controlling the bleed of air from a multi-stage compressor by switching from a first bleed to a second bleed is provided by the combination of a normally closed valve disposed in a duct connected to the second bleed, pressure sensing means disposed to sense a pressure which is substantially unaffected by the opening and closing of the normally closed valve and which is a function of the pressure at the first bleed, and means for opening the normally closed valve in response to the sensed pressure indicating a pressure at the first bleed below a predetermined limit. It is possible to make the switch as described above because in a multi-stage compressor if the pressure at one stage is known, the pressure in any other stage can be determined since it is a function of the known pressure. See FIG. 4.

The air bled from the compressor may be used, for example, to supply the air-conditioning system, the cabin pressurization system, or pumps, etc., of a jet aircraft with air. In such case one or more of the gas turbine engines utilized to power the aircraft provides the multi-stage compressor from which the air is bled.

The foregoing and other objects, features and advantages of the present invention will become more apparent in light of the following detailed description of a preferred embodiment thereof, as illustrated in the accompanying drawings.

DESCRIPTION OF THE DRAWINGS

FIG. 4 is a graphical illustration of the relationship between the pressure of one stage of a multi-staged compressor and the pressure of a second stage of the compressor.

FIG. 5 is a schematic illustration of still another embodiment of my invention.

DESCRIPTION OF THE PREFERRED EMBODIMENT

Figure 1:
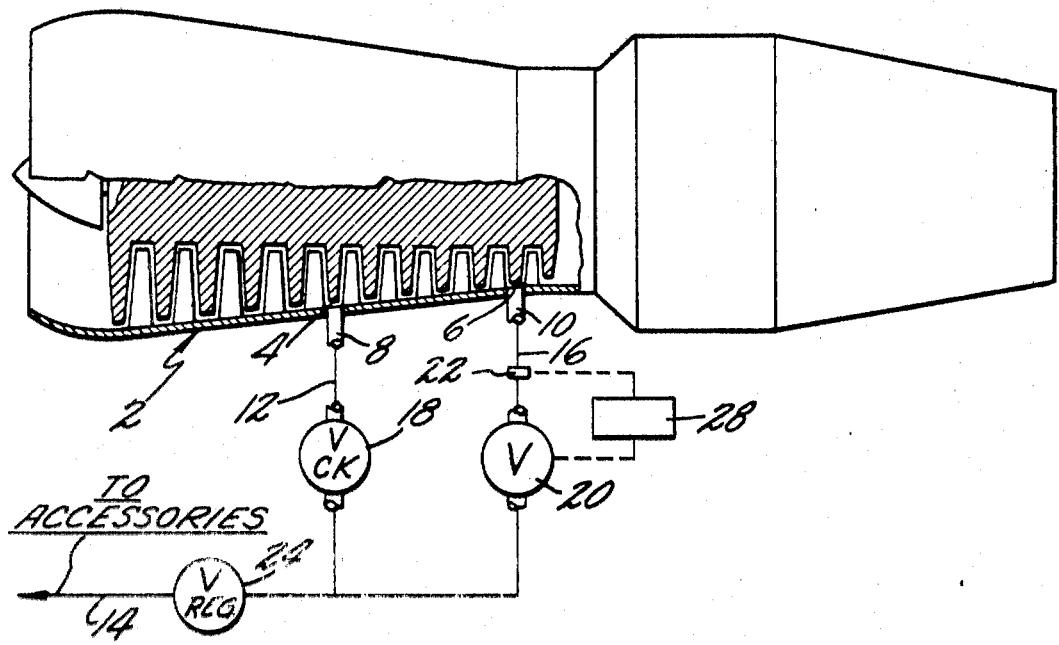
FIG. 1 is a schematic illustration of an exemplary embodiment of an apparatus for controlling the bleed or air from a multi-stage compressor in accordance with the present invention.

Referring to FIG. 1, there is shown generally a multi-stage compressor 2 which may be, for example, an aircraft gas turbine engine compressor having a mid-stage 4 and a high-stage 6. The mid-stage of the compressor has a bleed 8 and the high-stage has a bleed 10. A duct 12 connects the mid-stage bleed 8 to a duct 14, and a duct 16 connects the high-stage bleed 10 to the duct 14. The duct 14 delivers the bleed air to its destination which may be accessories (not shown) such as an aircraft air-conditioning system or a cabin pressurization system. A check valve 18 is disposed in the duct 12 to prevent the flow of air from the duct 14 towards the mid-stage bleed 8. A normally closed valve 20 is disposed in the duct 16, and pressure sensing means 22 is also disposed in the duct 16 upstream of the normally closed valve 20 to which pressure sensing means 22 is operatively connected. Pressure regulating means 24, such as any one of several types of pressure regulating valves well-known in the art, may be disposed in the duct 14 downstream of the connection of the duct 12 and the duct 14.

Operation is as follows: Normally air is bled from the mid-stage because this is the least penalizing to engine efficiency. When the mid-stage pressure falls below a limit necessary to supply the accessories, such as during high altitude flight or low engine r.p.m., the pressure in the high-stage pressure will likewise fall. As shown in FIG. 4 since the high-stage pressure is known as a function of mid-stage pressure, i.e., for any given mid-stage pressure there is a corresponding high-stage pressure, when the mid-stage pressure falls below that limit, the high-stage pressure also falls below a corresponding known pressure; therefore, the pressure sensing means 22, which is sensing the high-stage pressure, is sensing, in effect, a pressure which is a function of the mid-stage pressure, and the normally closed valve 20 is opened when the high-stage pressure falls below that corresponding pressure. The valve 20 will remain open until the pressure sensed by means 22 rises above the limit pressure at which time the valve 20 will close. A check valve 18 is disposed in the duct 12 to prevent high pressure bleed air from flowing towards the mid-stage bleed 8 when the valve 20 is open. Pressure regulating means 24 may be provided to regulate the air pressure being transmitted to the accessories.

Figure 2:
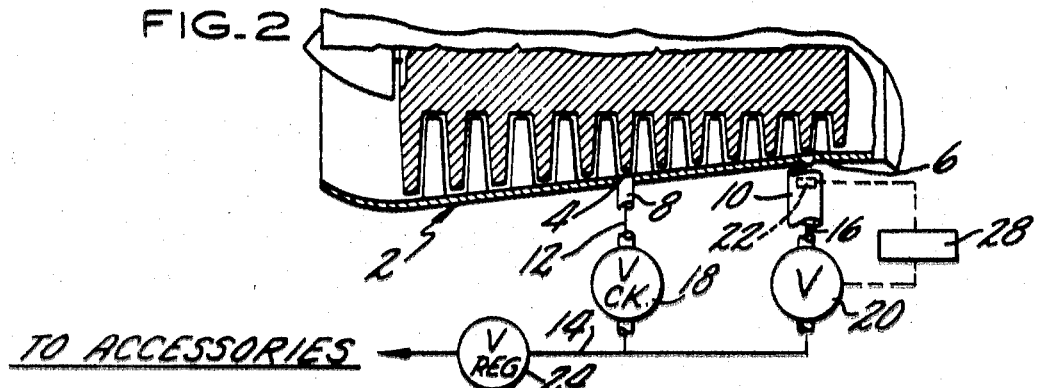
FIG. 2 is a schematic illustration of another embodiment of my invention.

FIG. 2 shows another embodiment of my invention in which the pressure sensing means 22 is disposed at the high-stage bleed 10 itself. Like components have like numbers. The operation of this embodiment is identical to that shown in FIG. 1.

Figure 3:
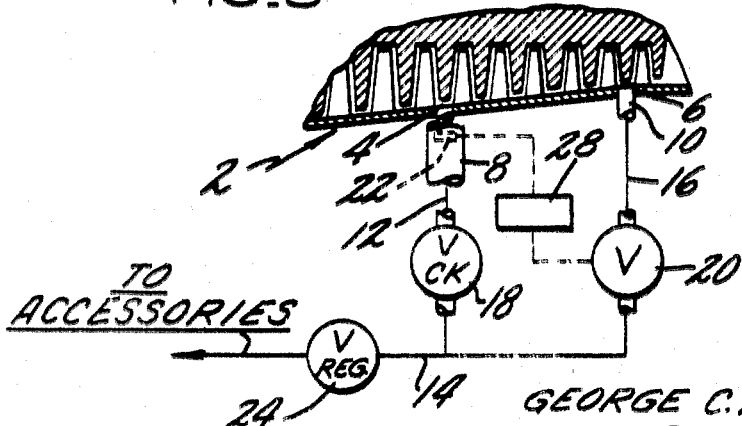
FIG. 3 is a schematic illustration of a third embodiment of my invention.

FIG. 3 shows still another embodiment of the invention in which the pressure sensing means 22 is disposed at the mid-stage bleed 8. Like components have like numbers and its operation is identical to the embodiments of FIG. 1 and FIG. 2. It will be obvious to one skilled in the art that the sensed pressure in any of the FIGS. 1–3 is substantially unaffected by the opening and closing of the normally closed valve 20 so that the system is inherently stable.

FIG. 5 shows still another embodiment of my invention in which the normally closed valve 20 may itself be modulated so that it regulates the pressure in the duct 14 to the accessories for reasons mentioned hereinbefore. The high-stage bleed 10 pressure is continuously sensed by the pressure sensing means 22 shown as a pneumatic switching control of a type well-known in the art. The switching pressure may be a preset value of high-stage bleed pressure scheduled with altitude. At pressures above the preset value the valve 20 is held shut by the pressure against the small piston 26 of the half-area actuator 28. As the high-stage bleed pressure falls below the scheduled switching pressure, a poppet 30 opens to pressurize the large piston 32 of the half-area actuator 28, causing the valve 20 to open. Altitude pressure variation may be compensated by an evacuated bellows 34. Pressure regulation may be accomplished by controlling the servo pressure $P_S$ acting in the large piston 32 to modulate the valve 20. The servo pressure $P_S$ is controlled by a poppet 36 contained within a pressure regulator 42 which bleeds servo pressure at a controlled rate. The position of the poppet 36 is determined by sensed downstream pressure in the duct 14 acting on control diaphragms 38 and 40.

There has thus been described a preferred embodiment of a compressor bleed flow control in accordance with the present invention. While an aircraft gas turbine engine compressor has been shown as an example to describe my invention, it will be obvious to anyone skilled in the art that my invention is valuable where it is desired to bleed any type of multi-stage compressor from two different stages. Therefore, it should be understood by those skilled in the art that various changes and omissions in the form and detail thereof may be made therein without departing from the spirit and scope of the invention, which is to be limited only as set forth in the following claims:

What I claim and desire to secure by Letters Patent of the United States is:

1. Apparatus for controlling the bleed of air from a multi-staged compressor having a first bleed and a second bleed, including means for switching from said first bleed to said second bleed, comprising:
   first duct means;
   second duct means connecting said first bleed to said first duct means;
   a check valve disposed in said second duct means for preventing flow from said first duct means towards said first bleed;
   third duct means connecting said second bleed to said first duct means;
   a normally closed valve disposed in said third duct means;
   pressure sensing means disposed to sense a pressure which is unaffected by the opening and closing of said normally closed valve and which is a function of the pressure at said first bleed; and
   means for opening said normally closed valve in response to said sensed pressure indicating a pressure at said first bleed below a predetermined limit.

2. Apparatus for controlling the bleed of air from a multi-staged compressor as recited in claim 1, wherein said pressure sensing means senses the pressure in said third duct means upstream of said normally closed valve.

3. Apparatus for controlling the bleed of air from a multi-staged compressor as recited in claim 1, wherein said pressure sensing means senses the pressure at said first bleed.

4. Apparatus for controlling the bleed of air from a multi-staged compressor as recited in claim 1, wherein said pressure sensing means senses the pressure at said second bleed.

5. Apparatus for controlling the bleed of air from a multi-staged compressor as recited in claim 1, additionally comprising:
   means for regulating the pressure downstream of said normally closed valve within a predetermined range when said valve is open.

6. Apparatus for controlling the bleed of air from a multi-staged compressor as recited in claim 1, additionally comprising:
   modulating means operatively connected to said means for opening said normally closed valve and responsive to said pressure sensing means, said modulating means modulating said normally closed valve only when said valve is open for regulating the pressure in said first duct to a value within a predetermined range.

References Cited

UNITED STATES PATENTS

| 2,837,269 | 6/1958 | Torell | 230—114 |
|---|---|---|---|
| 3,137,210 | 6/1964 | Gavin | 230—114 X |
| 3,207,422 | 9/1965 | Best | 230—114 X |
| 3,332,605 | 7/1967 | Huesgen | 230—114 X |
| 3,446,425 | 5/1969 | Cleeves | 230—114 |

LEONARD H. GERIN, Primary Examiner

U.S. Cl. X.R.

244—59; 60—39.18